United States Patent [19]

Scott et al.

[11] Patent Number: 4,550,241

[45] Date of Patent: Oct. 29, 1985

[54] METAL MELTING TOOL WITH IMPROVED STAND-OFF MEANS

[75] Inventors: William B. Scott, Rochelle; Bruce E. Ahmer, Rockford, both of Ill.

[73] Assignee: W. A. Whitney Corp., Rockford, Ill.

[21] Appl. No.: 606,573

[22] Filed: May 3, 1984

Related U.S. Application Data

[63] Continuation of Ser. No. 388,278, Jun. 14, 1982, abandoned.

[51] Int. Cl.⁴ .................. B23K 26/00; B23K 26/14
[52] U.S. Cl. .................. 219/121 LG; 219/121 FS
[58] Field of Search ............. 219/121 LN, 121 LG, 219/121 FS, 121 L, 121 LM

[56] References Cited

U.S. PATENT DOCUMENTS

| | | | |
|---|---|---|---|
| 3,600,065 | 8/1971 | Law et al. | 350/247 |
| 3,736,402 | 5/1973 | Mefferd et al. | 219/121 |
| 4,201,905 | 5/1980 | Clark et al. | 219/121 |
| 4,417,125 | 11/1983 | Tsutsumi | 219/121 |

*Primary Examiner*—C. L. Albritton
*Attorney, Agent, or Firm*—Leydig, Voit & Mayer, Ltd.

[57] ABSTRACT

A pneumatic bearing encircles the cutting tip of a laser cutting tool and causes the tool to float vertically relative to an underlying worksheet on a pressurized cushion of air so as to maintain a substantially constant stand-off distance between the cutting tip and the work while avoiding physical contact between the tool and the work. Passages formed through the bearing enable cutting gas to escape from the bearing without interfering with the pressurized air cushion, the passages being shaped and located to prevent laser energy from being radiated directly at the operator of the tool.

5 Claims, 5 Drawing Figures

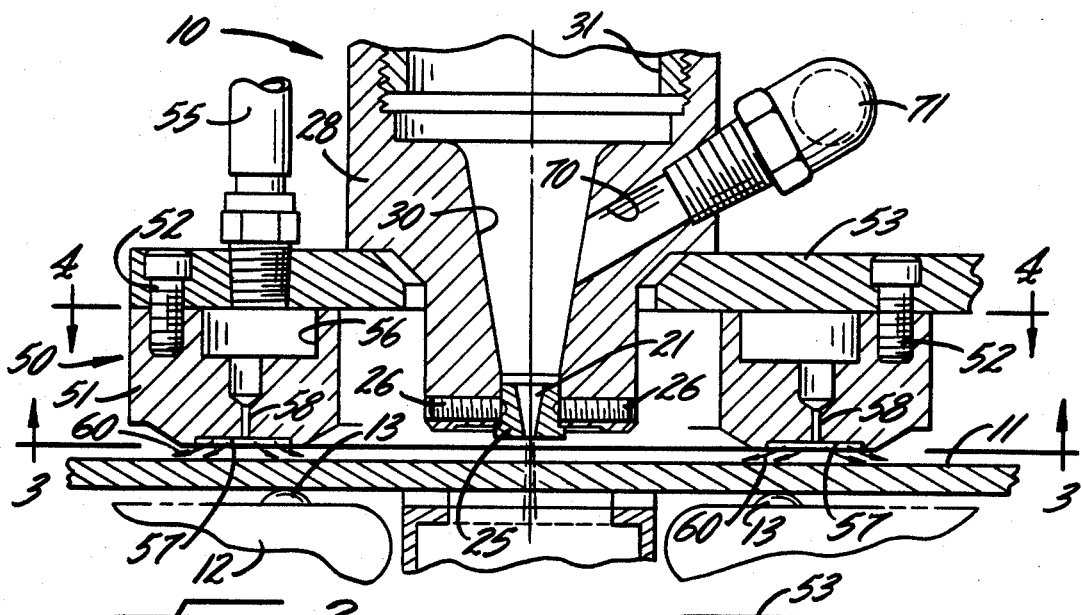
_Fig. 2._
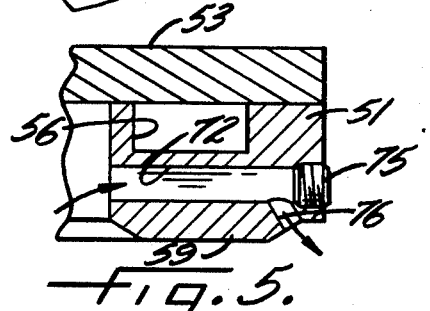
_Fig. 5._
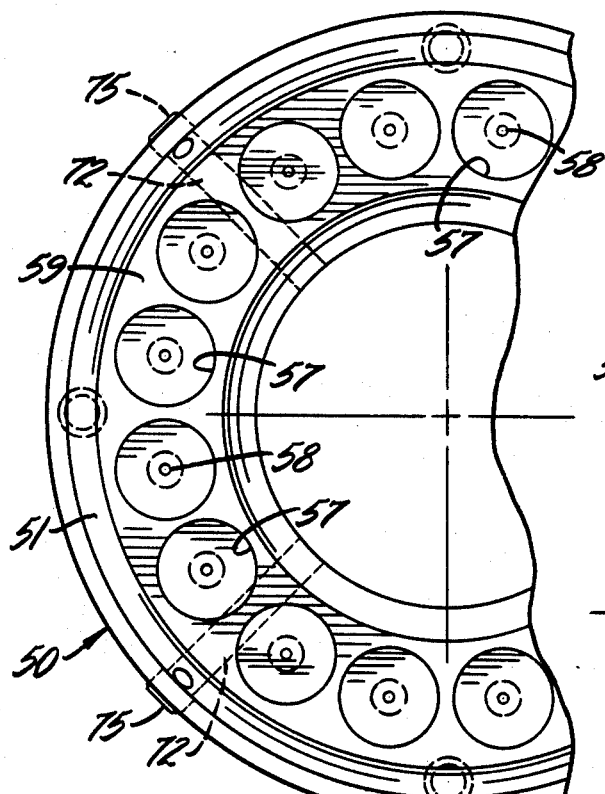
_Fig. 3._
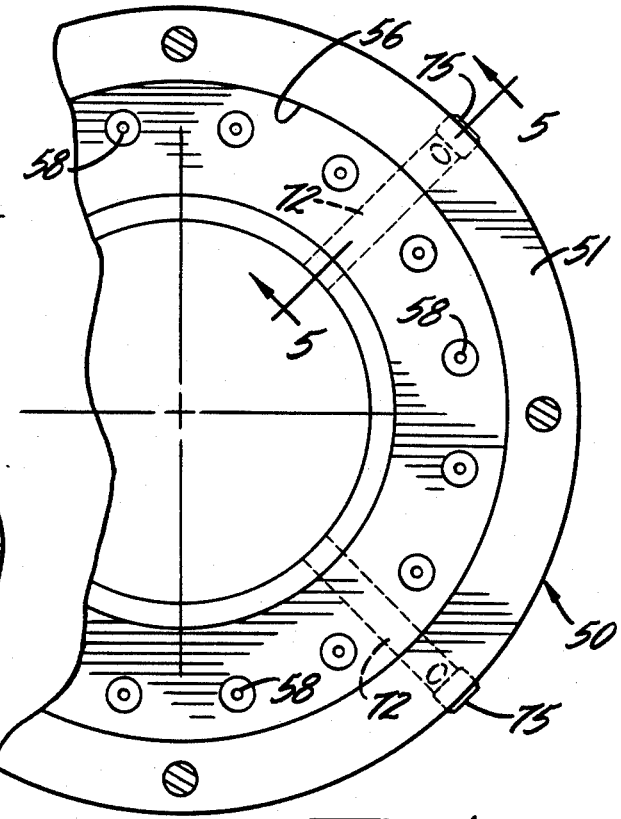
_Fig. 4._

METAL MELTING TOOL WITH IMPROVED STAND-OFF MEANS

This is a continuation of application Ser. No. 388,278, filed June 14, 1982, abandoned.

BACKGROUND OF THE INVENTION

This invention relates generally to a metal melting tool for cutting holes or irregular shapes in a substantially horizontal worksheet made of metal, plastic or the like. The metal melting tool may be a plasma-arc torch of the type disclosed in Brolund et al U.S. Pat. No. 4,063,059. In the preferred embodiment of the invention, however, the metal melting tool is a laser cutting tool of the same general type as disclosed, for example, in Clark et al U.S. Pat. No. 4,201,905.

A typical metal melting tool of the above type (i.e., a plasma-arc torch or a laser cutting tool) includes a tip spaced just above the worksheet and operable to emit downwardly directed energy for melting the worksheet. Holes or irregular shapes are formed through the worksheet as the latter is moved horizontally relative to the tool, such movement usually being produced by bodily shifting the work beneath the tool along coordinate horizontal axes while holding the tool in a horizontally stationary position. When the tool is a laser, a pressurized stream of cutting gas such as oxygen, air or an inert gas is directed toward the tip of the tool. Certain cutting gases such as oxygen coact with the laser beam to form an exothermic reaction and increase the cutting speed and effectiveness of the laser.

In order for the cutting tip to function properly, it is necessary that the tip remain spaced a substantially constant distance above the worksheet as the latter is moved horizontally relative to the tool. Many worksheets, however, are bowed or cambered and thus the upper surface of the worksheet does not lie in a true horizontal plane. To accommodate such a worksheet, the tool is mounted for up and down movement and carries means on its lower end for maintaining the tool at a constant stand-off height relative to the work. In the Clark et al apparatus, for example, the stand-off means is in the form of a collar which encircles the tip of the tool and carries a plurality of rotatable balls. The balls ride on the upper surface of the worksheet and cause the tool to move upwardly and downwardly as necessary to maintain a substantially constant spacing between the cutting tip and the worksheet. Even though the Clark et al patent refers to the balls as being "anti-friction balls", the balls do create some drag on the worksheet and cause the cutting tip to deflect relative to the direction of travel, such deflection impairing the cutting accuracy of the tool and particularly when a sharply curved or angled shape is being cut. In addition, the rubbing action of the balls against the worksheet causes scratches to be formed in certain types of worksheets such as stainless steel sheets.

SUMMARY OF THE INVENTION

The general aim of the present invention is to provide a metal melting tool having new and improved stand-off means which establish the stand-off height of the tool with high accuracy while being completely free of physical engagement with the work so as to avoid creating drag between the tool and the work and to avoid marring and scratching of the work.

A more detailed object of the invention is to achieve the foregoing by providing stand-off means in the form of a pneumatic bearing which encircles the tip of the tool and which causes a pressurized cushion of air to exist between the tool and the work. The pressurized cushion causes the tool to float upwardly and downwardly as necessary to maintain a substantially constant stand-off height and yet, at the same time, leaves all parts of the tool free of physical engagement with the work so as to eliminate frictional drag and scratching.

Another object of the invention is to provide a pneumatic bearing which is uniquely constructed to enable cutting gas to be introduced adjacent the tip of the tool while preventing the cutting gas from interfering with the pressurized cushion created by the bearing The invention also resides in the provision of novel passages in the bearing to enable the cutting gas to escape from the bearing without interfering with the pressurized cushion, the passages also preventing the cutting energy from being radiated directly at the operator of the tool.

These and other objects and advantages of the invention will become more apparent from the following detailed description when taken in conjunction with the accompanying drawings.

BRIEF DESCRIPTION OF THE DRAWINGS

FIG. 2 is an enlarged fragmentary cross-section of the pneumatic bearing and the cutting tool tip shown in FIG. 1.

FIG. 3 is a fragmentary bottom plan view of the bearing shown in FIG. 2, the view being taken along the line 3—3 of FIG. 2.

FIG. 4 is a fragmentary cross-section taken substantially along the line 4—4 of FIG. 2.

FIG. 5 is a fragmentary cross-section taken substantially along the line 5—5 of FIG. 4.

DETAILED DESCRIPTION OF THE PREFERRED EMBODIMENT

Figure 1:
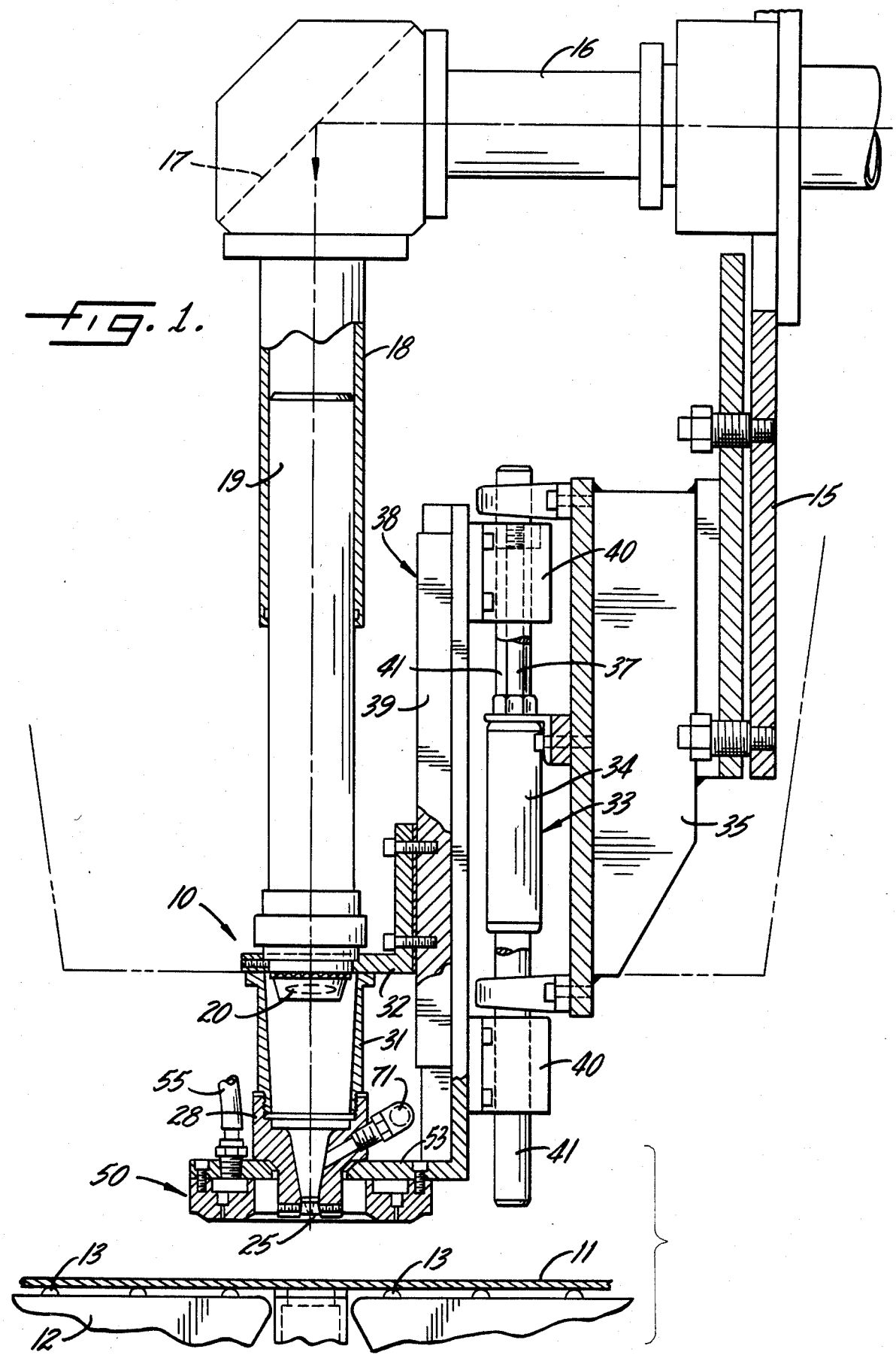
FIG. 1 is a fragmentary side elevational view of a typical metal cutting tool equipped with a new and improved pneumatic bearing incorporating the unique features of the present invention, certain parts being broken away and shown in section.

The present invention is illustrated in the drawings in conjunction with a metal melting tool 10 for forming holes and irregular shapes in a workpiece 11 which herein has been shown as being a substantially flat piece of sheet metal disposed in a generally horizontal plane. Underlying and supporting the worksheet 11 is a table 12 having a plurality of anti-friction balls 13 which engage the underside of the worksheet. The table is adapted to be moved horizontally to shift the worksheet back and forth along one axis beneath the tool 10. Clamps (not shown) are adapted to shift the worksheet back and forth along a right angle axis across the top of the table so that virtually any portion of the worksheet may be positioned beneath the tool. Reference may be had to Brolund et al U.S. Pat. No. 4,106,183 for a more detailed disclosure of apparatus for supporting the worksheet and for shifting the latter along coordinate axes.

While the metal melting tool 10 may be a plasma-arc torch of the type disclosed in the aforementioned Brolund et al patents, the tool which has been illustrated herein is a laser beam cutting tool such as a $CO_2$ laser. Briefly, such a tool comprises a fixed support or frame 15 which mounts a horizontal laser beam pathway tube 16, the latter leading to a laser generator (not shown). Laser energy which is directed through the tube is reflected downwardly by a mirror assembly 17 into a fixed outer vertical tube 18 and an inner vertical tube 19 which is telescoped into the outer tube. The laser energy passes through a lens assembly 20 at the lower end of the inner tube 19 and is focused through a downwardly tapered orifice 21 (FIG. 2) formed in a cutting tip 25. The latter is fastened by screws 26 within a cutting head 28 and is located at the lower end of a downwardly tapered bore 30 which is formed in the head. The head 28 is supported on the lower end portion of a sleeve 31 (FIG. 1) whose upper end portion is secured to a bracket 32 which, in turn, is connected rigidly to the upper end portion of the lens assembly 20.

Means are provided for moving the cutting tip 25 between a raised inactive position (FIG. 1) spaced a substantial distance above the worksheet 11 and a lowered active position (FIG. 2) in which the cutting tip is spaced just a small distance (e.g., 0.005") above the worksheet to cause the laser energy to be focused precisely relative to the worksheet to effect optimum cutting action. Herein, these means comprise a reciprocating pneumatic actuator 33 (FIG. 1) having a cylinder 34 secured rigidly to a mounting bracket 35 on the frame 15 and having a rod 37 which is connected to a bracket 38. The bracket 38 includes an upright portion 39 which is connected to the bracket 32 and which carries upper and lower ball bushings 40. Vertical guide rods 41 are secured to the mounting bracket 35 and extend through the bushings to support the bracket 38, the bracket 32, the head 28 and the inner tube 19 for up and down movement relative to the bracket 35, frame 15 and the outer tube 18.

When the rod 37 of the actuator 33 is extended upwardly, the cutting tip 25 is retracted upwardly from the worksheet 11 as shown in FIG. 1 to enable servicing of the cutting tip or other elements of the head 28. Downward retraction of the rod 37 lowers the cutting tip to its active cutting position shown in FIG. 2. Once the tip has reached that position, both ends of the cylinder 34 are de-pressurized so as to permit the cutting tip, the head 28 and the lens assembly 20 to float freely in an up and down direction as permitted by the slidably telescoped outer and inner tubes 18 and 19 and by the sliding fit of the bushings 40 on the guide rods 41.

Free vertical floating of the cutting tip 25 is necessary in order to enable a substantially constant vertical spacing or stand-off height to be maintained between the cutting tip and all areas of the worksheet 11. Most worksheets are not precisely flat but instead are bowed or cambered and thus the overall upper surface of the worksheet does not lie in a true horizontal plane. In order for the laser beam to cut the worksheet in an optimum manner, it is necessary to keep the beam properly focused relative to all portions of the worksheet. Also it is necessary to maintain a substantially constant stand-off height between the cutting tip and different portions of the worksheet as the latter is moved beneath the cutting tip. By supporting the head 28 for vertical floating, the lens assembly 20 and the cutting tip 25 may move upwardly and downwardly relative to the upper surface of the worksheet to the extent necessary to maintain the proper focus and to enable a substantially constant stand-off height to be maintained between the tip and the worksheet. Means must be provided, however, for sensing the elevation of the upper surface of the worksheet and for causing the tip to move upwardly and downwardly relative thereto to establish the constant stand-off height.

The present invention contemplates the provision of new and improved stand-off means in the form of a pneumatic bearing 50 which establishes a precisely constant stand-off height between the cutting tip 25 and the worksheet 11 without physically contacting the worksheet. Because there is no physical contact between the stand-off bearing 50 and the worksheet 11, there is virtually no frictional drag between the two. As a result, movement of the worksheet beneath the tip 25 does not deflect the tip relative to the direction of travel and impair the cutting accuracy of the laser beam but instead the beam always remains directed downwardly along a true vertical path. Moreover, the absence of physical contact between the stand-off bearing and the worksheet completely eliminates the danger of the worksheet being scratched or marred by the bearing.

More specifically, the pneumatic stand-off bearing 50 includes a ring-like member 51 (FIGS. 2 to 4) which encircles the cutting tip 25 and the lower end portion of the head 28, the inner side of the ring 51 being spaced radially a substantial distance from the head. The upper side of the ring 51 is secured rigidly by screws 52 to the underside of a horizontal portion 53 of the bracket 38 and thus the ring moves upwardly and downwardly in unison with the head 28 and the tip 25.

In order to maintain a constant stand-off height between the worksheet 11 and the cutting tip 25, a pressurized cushion of air is created between the worksheet and the lower side of the ring 51. If the upper surface of the worksheet tends to move closer to the cutting tip, the pressure of the air cushion automatically increases to force the ring and the cutting tip upwardly and thereby preserve a constant stand-off height. Conversely, the pressure of the air cushion automatically decreases and allows the cutting tip to shift downwardly if a portion of the worksheet disposed at a lower elevation moves beneath the tip.

To create the pressurized cushion, air under pressure is admitted through a line 55 (FIG. 2) into an annular manifold 56 formed in the upper side of the ring 51, the manifold being defined by an annular groove in the ring and being closed off at its upper end by the horizontal portion 53 of the bracket 38. Formed in a circle around the lower side of the ring 51 are several angularly spaced ports or pads 57 (FIG. 3). The pads communicate with the manifold by way of restricted passages 58 (FIG. 2) formed in the ring 51 and extending vertically between the manifold and the pads. The bottom surface 59 (FIG. 3) of the ring immediately adjacent the pads 57 is flat and planar and defines narrow sill clearances 60 (FIG. 2) between the worksheet and the underside of the ring.

With the foregoing arrangement, pressurized air directed into the manifold 56 flows through the restricted passages 58 and into the pads 57 to create a pressurized cushion of air between the worksheet 11 and the ring 51. The air in the cushion escapes from beneath the ring at a controlled rate via the sill clearances 60. If the upper surface of the worksheet tends to move toward the ring the sill clearances become narrower to restrict the flow of air from the cushion and to increase the pressure thereof so as to cause the ring and the cutting tip 25 to move upwardly. On the other hand, the sill clearances 60 become wider when the upper surface of the worksheet tends to move away from the ring. As a result, the pressure of the air cushion decreases to enable the cutting tip 25 to move downwardly under its own weight. In this way, a constant stand-off height is maintained between the cutting tip and all portions of the worksheet. There is, however, no physical contact between the worksheet and the bearing 50. Accordingly, marring of the worksheet by the bearing is avoided and, in addition, the absence of frictional drag between the worksheet and the bearing results in the laser beam remaining in a true vertical path rather than being deflected relative to the direction of travel of the worksheet as otherwise is the case when a stand-off bearing drags relative to a worksheet and causes deflection of the cutting tip. Thus, the cutting action of the laser beam is rendered more precise and particularly when the worksheet makes a sharp change in direction relative to the cutting tip.

In accordance with conventional practice, oxygen, air or an inert gas may be introduced into the cutting head 28 for various purposes. For example, oxygen interacts with the laser energy to form an exothermic reaction and increase the cutting effectiveness of the laser.

Herein, the cutting gas is introduced into the head 28 by way of a passage 70 (FIG. 2) formed in the head and communicating at its inner end with the bore 30 in the head. The outer end of the passage 70 communicates with a line 71 which leads to a pressurized source of cutting gas. Such gas flows through the passage 70 and into the bore 30 and then flows through the orifice 21 of the cutting tip 25 into the annular chamber defined by the outer side of the head 28, the inner side of the ring 51, the upper surface of the worksheet 11 and the lower surface of the bracket portion 53.

According to another aspect of the invention, the cutting gas which is introduced into the aforementioned chamber is permitted to escape therefrom without flowing through the sill clearances 60 and affecting the action of the pressurized cushion beneath the bearing 50. For this purpose, a series (herein, four) of angularly spaced and radially projecting passages 72 (FIG. 5) are formed through the ring 51 and extend from the inner side of the ring to the outer side thereof. The passages are located above the pads 57 and permit the cutting gas to escape from within the ring 51 without flowing through the sill clearances 60 and affecting the pressure of the air cushion.

In keeping with the invention, the inner end of each escape passage 72 is open but the outer end thereof is closed by a threaded plug 75 (FIG. 5). To permit cutting gas to escape from each passage 72, a downwardly and outwardly inclined passage 76 is formed in the ring 51 and is located with its upper end disposed in communication with the outer end portion of the passage 72. The lower end portion of each passage 76 opens out of the lower surface of the ring 51 at a position located outboard of the outer sill clearance 60. Thus, cutting gas may escape through the passages 72 and 76 without flowing through the sill clearances but, at the same time, the angled relationship between the passages 72 and 76 prevents laser energy from being radiated radially out of the passages 76 and transmitted directly toward the operator of the tool 10. Instead, such energy for the most part is absorbed by the plugs 75.

We claim:

1. Apparatus for cutting a substantially horizontal worksheet, said apparatus comprising a support, a metal melting tool having a tip spaced above said worksheet and operable to emit downwardly directed energy and cutting gas for melting said worksheet, means mounting said tip and said worksheet for relative horizontal movement whereby to enable said tip to cut different areas of said worksheet, and means mounting said tip for up and down floating on said support to enable the elevation of said tip to be changed, the improvement in said apparatus comprising, a pneumatic bearing comprising a ring connected to said tool and encircling said tip, said ring having a lower surface spaced upwardly from said worksheet and formed with downwardly opening pad means which face said worksheet, means for introducing pressurized gas into said pad means, the lower surface of said ring defining a narrow sill clearance adjacent said pad means and between said worksheet and said lower surface of said ring whereby said pressurized gas creates a pressurized cushion within said pad means and escapes at a controlled rate via said sill clearance to maintain said ring and said tip at a substantially constant spacing above said worksheet as the latter is moved horizontally relative to said tip, and at least one passage extending between the inner and outer sides of said ring above said sill clearance to permit said cutting gas to escape from said ring without any substantial flow of said cutting gas through said sill clearance.

2. Apparatus as defined in claim 1 in which said pad means comprise a series of downwardly opening ports spaced angularly around the lower surface of the ring, an annular manifold for pressurized gas formed in the upper surface of said ring, and restricted passages formed in said ring and establishing communication between said manifold and said ports.

3. Apparatus as defined in claim 1 in which said passage includes a generally radially extending section extending outwardly from the inner side of said ring and terminating short of the outer side of the ring, said passage further including a downwardly and outwardly inclined section having an upper end communicating with the outer end portion of the radially extending passage section and having a lower end opening out of the lower surface of said ring at a position located outboard of said sill clearance.

4. Apparatus for cutting a substantially horizontal worksheet, said apparatus comprising a support, a laser having a tip spaced above said worksheet and operable to emit downwardly directed energy for melting said worksheet, means adjacent said tip for directing a stream of cutting gas into the energy generated by said laser, means mounting said tip and said worksheet for relative horizontal movement whereby to enable said tip to cut different areas of said worksheet, and means mounting said tip for up and down floating on said support to enable the elevation of said tip relative to said support to be changed, the improvement in said apparatus comprising, a pneumatic bearing connected to said tip and operable to cause said tip to move vertically relative to said support to the extent necessary to maintain a substantially constant vertical spacing between said tip and said worksheet as the latter is moved horizontally relative to said tip, said bearing comprising a generally horizontal ring encircling said tip, a series of downwardly opening ports spaced angularly around the lower surface of the ring, an annular manifold formed in said ring, means for introducing pressurized gas into said manifold, restricted passages formed in said ring and establishing communication between said manifold and said ports whereby pressurized gas in said manifold is directed into said ports, the lower surface of said ring defining narrow sill clearances adjacent said ports and between said worksheet and the lower side of said ring whereby the pressurized gas in said ports creates a pressurized cushion beneath said ring and escapes via said sill clearances, said cutting gas being directed into the interior of said ring, and a series of angularly spaced passages extending between the inner and outer sides of said ring above said sill clearances to permit said cutting gas to escape from said ring without any substantial flow of said cutting gas through said sill clearances.

5. Apparatus as defined in claim 4 in which each of said angularly spaced passages includes a generally radially extending section extending outwardly from the inner side of said ring and terminating short of the outer side of the ring, each of said passages further including a downwardly and outwardly inclined section having an upper end communicating with the outer end portion of the respective radially extending passage section and having a lower end opening out of the lower surface of said ring at a position located outboard of said sill clearances.

* * * * *